(12) United States Patent
Nagaralu et al.

(10) Patent No.: US 8,131,691 B1
(45) Date of Patent: Mar. 6, 2012

(54) SYSTEM AND METHOD FOR UPDATING A SEARCH ENGINE INDEX BASED ON WHICH FILES ARE IDENTIFIED IN A FILE CHANGE LOG

(75) Inventors: Sree Hari Nagaralu, Pune (IN); N. Sunder Phani Kumar, Pune (IN); Shyamshankar Dharmarajan, Pune (IN); Joseph M. Maionchi, Vallejo, CA (US); Craig K. Harmer, San Francisco, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1771 days.

(21) Appl. No.: 11/216,221

(22) Filed: Aug. 31, 2005

Related U.S. Application Data (63) Continuation-in-part of application No. 10/334,101, filed on Dec. 30, 2002, now Pat. No. 7,890,469, and a continuation-in-part of application No. 11/064,557, filed on Feb. 24, 2005.

(60) Provisional application No. 60/695,799, filed on Jun. 30, 2005.

(51) Int. Cl.
*G06F 7/00* (2006.01)
*G06F 17/00* (2006.01)

(52) U.S. Cl. ...................................... 707/696
(58) Field of Classification Search ......................... None
See application file for complete search history.

(56) References Cited

U.S. PATENT DOCUMENTS 6,067,541 A * 5/2000 Raju et al. ........................ 707/3

OTHER PUBLICATIONS

D. Kawamoto, CNET News.com, "Google Tests Tool to Aid Web Indexing," Jun. 6, 2005, http://www.zdnetasia.com/toolkits/0,39045920,39234713-107q,00.htm (printed Aug. 30, 2005).
Platform SDK: Indexing Service, "What is Indexing Service?" Platform SDK Release: Feb. 2003, pp. 1-2, http://msdn.microsoft.com/library/en-us/indexsrv/html/ixintro_0311.asp?frame=true (printed Aug. 30, 2005).
S. Green, Sun Microsystems Laboratories, White Paper: Advanced Search Technology, "Sun's Advanced Search Technology Gives Portal and Web Server Products a Competitive Advantage," Jan. 21, 2004, on pp. 1-17.

* cited by examiner

*Primary Examiner* — Michael Hicks
(74) *Attorney, Agent, or Firm* — Campbell Stephenson LLP (57) ABSTRACT

Various methods and systems for updating a search engine index based on a file change log are disclosed. One method involves accessing a file, which stores a file change log maintained by a file system. The file change log identifies one or more recently modified files. The method also involves updating an index, based on a recently-modified file identified in the file change log. The index is used to search files maintained by the file system. An application external to the file system accesses the file storing the file change log and updates the index.

22 Claims, 3 Drawing Sheets

SYSTEM AND METHOD FOR UPDATING A SEARCH ENGINE INDEX BASED ON WHICH FILES ARE IDENTIFIED IN A FILE CHANGE LOG

RELATED APPLICATIONS

This application claims priority to U.S. Provisional Patent Application No. 60/695,799, filed Jun. 30, 2005, entitled "System and Method for updating a Search Engine Index Based on Which Files are Identified a File Change Log," and naming Sree Hari Nagaralu, Nookala Sunder Phani Kumar, Shyamshankar Dharmarajan, Joseph M. Maionchi, and Craig Keatley Harmer as inventors. This application is a continuation-in-part of U.S. patent application Ser. No. 10/334,101, filed Dec. 30, 2002 now U.S. Pat. No. 7,890,469, which is titled "File Change Log" and has Joseph M. Mainochi, John A. Colgrove, and Craig K. Harmer as inventors, as well as U.S. patent application Ser. No. 11/064,557, filed Feb. 24, 2005, which is titled "Method and Apparatus for Utilizing a File Change Log" and has Yusuf Batterywala, Naga Kishore Kommuri, Nookala Sunder Phani Kumar, and Sree Hari Nagaralu as inventors. All three of the above-referenced applications are hereby incorporated by reference, as if completely and fully set forth herein.

FIELD OF THE INVENTION

This invention relates to indexing applications and, more particularly, to updating indexing information maintained by an indexing application.

DESCRIPTION OF THE RELATED ART

Search engines are used to search a collection of documents. For example, a corporation can use a search engine to search documents within that corporation's intranet. A typical search engine uses indexing functionality to create an index corresponding to the collection of documents searched by the search engine. Searching can then be performed based on the index.

Indexing is performed by periodically opening searchable files within the collection, or by scanning the collection for files using a file system command like "find," and then updating the index based on the contents and/or characteristics of those files. Indexing can take into account text included in each file (e.g., based on the words included in that file, the position of particular words within that file, and/or the number of times each word occurs within the text of that file). For example, the indexing functionality can create an index that is an inverted file that includes all of the individual words found within the files in the collection. The index identifies each file that included a particular word, as well as the number of times that file included the particular word and the positions or fields (e.g., header, title, and the like) within that file that included the particular word. Additionally, the indexing functionality can index the collection based on file characteristics such as the creation time, the most recent modification time, file type, file size, and the like. Indexing functionality can also create an index based on a semantic analysis of the file or an examination of the relationships between words as a clue to the importance of their presence. For example, indexing functionality can look for pluaralization and conjugation of known words (e.g., so that "disk" and "disks" are both matched by a search for "disk").

Typically, updating the index requires a significant amount of time and resources, since the file system must periodically be scanned before modified files' content can be used to recalculate the index. All of the searchable files, even those that have not been modified, are accessed each time the index is updated. Thus, updating the index is an inefficient and time-consuming process, especially as the number and/or size of the searchable files increases. Accordingly, improved techniques for updating a search engine index are desired.

SUMMARY

Various embodiments of methods and systems for updating a search engine index based on a file change log are disclosed. In one embodiment, a method involves accessing a file, which stores a file change log maintained by a file system. The file change log identifies one or more recently modified files. The method also involves updating an index, based on a recently-modified file identified in the file change log. The index is used to search files maintained by the file system. An application external to the file system accesses the file storing the file change log and updates the index.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

FIG. 3 is a block diagram of a computing device that implements an indexing module, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Figure 1:
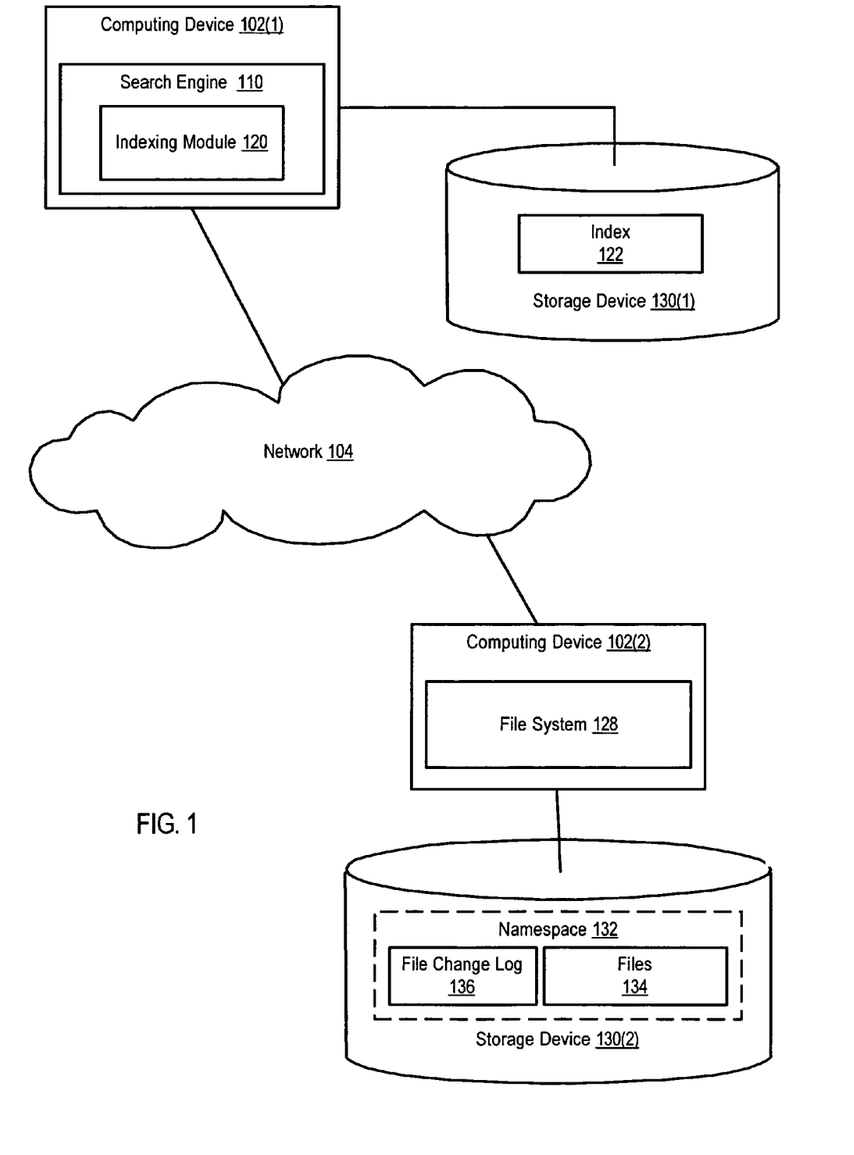
FIG. 1 is a block diagram of a system that includes an indexing module, according to one embodiment of the present invention.

FIG. 1 illustrates a block diagram of a computer system that includes an indexing module, which uses a file change log when updating an index used by a search engine. In the system of FIG. 1, two computing devices 102(1) and 102(2) are coupled by network 104.

Computing device 102(1) implements a search engine 110. Search engine 110 in turn includes an indexing module 120. Indexing module 120 creates and maintains index 122, as described in more detail below. Search engine 110 uses index 122 to search a set of files. For example, in response to a user query, search engine 110 can search index 122 for a particular keyword, user access statistic, and/or other criteria. Search 110 can then return the files that are identified in index 122 as matching those criteria to the user. For each criterion, index 122 can identify files (if any) that match that criterion. For example, if search engine 110 searches index 122 for a particular keyword, index 122 can store information, associated with that keyword, that identifies all files that contain at least one instance of that keyword.

Computing device 102(2) implements a file system 128. File system 128 maintains files 134, which can be searched using search engine 110, in namespace 132. File system 128 also maintains file change log 136.

Computing devices 102(1) and 102(2) can each include a workstation, personal computer, server, PDA (Personal Digital Assistant), cell phone, storage network switch, storage device, storage array controller, or any other device configured to execute software implementing a file system and/or search engine. Alternatively, each computing device 102(1) and 102(2) can be implemented from one or more logic devices (e.g., PLDs, FPGAs, and the like) configured to perform the functions of such applications. Computing devices 102(1) and 102(2) can also be implemented using logic devices that are configured to perform some of the functions of the applications and that are also configured to execute software implementing other functions of the applications. While file system 128 and search engine 110 are implemented on separate computing devices in the example of FIG. 1, it is noted that these applications can be implemented on the same computing device in other embodiments.

Network 104 can include one or more of various types of networks. Network 104 can include a local area network (LAN) or wide area network (WAN), such as the Internet, or a combination of one or more different types of networks. Various media can be used to implement network 104, including Ethernet links, wireless links, coaxial cables, and the like.

Storage devices 130(1) and 130(2) can be physical or logical storage devices, or an aggregation of several such storage devices. A physical storage device can be a single device (e.g., a single hard drive, CD (Compact Disc) drive, or DVD (Digital Versatile Disc) drive). Alternatively, a storage device may include an array of such devices (e.g., a Redundant Array of Independent Disks (RAID) array that contains several hard drives controlled by a hardware array controller).

File system 128 organizes data into files and/or directories (a directory is a special type of file). The particular set of one or more directories and/or files that file system 128 organizes can also be referred to as a "file system." It is noted that a file system need not include any user files (e.g., when the file system is created, the file system may include only a single file, which defines the root directory of the file system). In one embodiment, file system 128 is implemented using an application such as VERITAS File System (available from VERITAS Software Corp. of Mountain View, Calif.), which executes on a single computing device, as shown in FIG. 1. In other embodiments, file system 128 is a distributed file system that is implemented by executing an application such as VERITAS Cluster File System (CFS) on each of several independent computing devices.

Namespace 132 is defined by a set or group of names that is managed according to some naming convention by file system 128. Namespaces can vary among file systems. A flat namespace uses a single, unique name for every file system object. For example, a NetBIOS network requires a different name to be assigned to each computer and printer which appears as a file system object within a flat namespace. File system objects within the namespace can be accessed by applications (e.g., such as those applications executing on computing devices 102(1) and 102(2)). Namespace 132 includes files 134 and file change log 136.

File system 128 updates file change log 136 to indicate that a change (e.g., a change in the most recent access time associated with the file, a change in a value stored by the file, and the like) to one of files 134 has occurred. Thus, file change log 136 stores information identifying files within namespace 132 that have recently been accessed (e.g., written to or read from). In some embodiments, file change log 136 identifies only files that have recently been modified (e.g., written to, created, renamed, moved, and/or deleted). In other embodiments, file change log 136 identifies files that have recently been read from and/or modified. File system 128 updates file change log 136 whenever a file is modified in order to indicate that an access to a file has occurred.

File change log 136 can appear as a regular file (as opposed to a device, hidden, or system file) in namespace 132. File change log 136 can be implemented as a sparse file. In one embodiment, file change log 136 is accessible for read access using a file system-independent operating system function. Applications can read, open, close, and seek data in the file change log using file system-independent operating system functions. The file change log can be read by multiple applications simultaneously, even while the file system is writing data to the file change log. Multiple applications, such as indexing module 120, can access the file change log data to determine whether a file has been changed, without the need to scan the entire file system repeatedly. Such applications can scan the entire file system initially (e.g., in order to create index 122) and, thereafter, those applications can use the file change log to identify changed files (e.g., in order to update index 122 based on only those files which have changed). Enablement and disablement of the file change log is not controlled by application programs.

In some embodiments, even though file change log 136 appears as a regular file, operations that can potentially modify file change log 136, such as write operations, are not allowed to be initiated by applications other than file system 128. This protects file change log 136 from corruption that might otherwise result if, for example, an application or a user wrote to the file change log. In alternative embodiments, file change log 136 does not appear as a regular file within the name space. In such embodiments, external applications (i.e., applications that are not integrated with the file system) can read from file change log 136 via a special application programming interface (API) provided by file system 128. In one embodiment, this special API can be configured to resemble the file system independent interfaces for reading from a file; however, other embodiments can configure the special API differently.

In some embodiments, file change log 136 identifies files by inode numbers or other file reference numbers. In an alternative embodiment, file change log 136 identifies files by filename and/or pathname, so that applications are not burdened with the task of maintaining their own copies of file system metadata, such as file reference numbers, in order to be able to use file change log 136. Thus, file change log 136 can use a variety of file identifiers, including filenames, pathnames, inodes, and/or file reference numbers, to identify files that have been modified.

The types of changes to be tracked and logged by file change log 136 include selected changes to metadata, links to the file, and attributes of the file, as well as file creation, removal, and modification. In some embodiments, file change log 136 identifies files that have been modified, as well as the nature of the modification and/or the pre- and/or post-modification values of the file. In other embodiments, file change log 136 simply identifies which files have been modified and does not include information about the pre- and/or post-modification values or the nature of the modification. In one embodiment, entries in file change log 136 include the following information: a change type, a next record type, an identifier for the file that was modified, a timestamp for the change, a generation count, and/or a file name length. In such an embodiment, if a file change log record has a value for the file name length, the file change log record is followed by one or more records containing the file name. The file change log 136 can also store entity identifiers, which identify the entity that that initiated each modification recorded in file change log 136.

If file change log 136 identifies the type of modification in each record, an application such as indexing module 120 can differentiate between modifications that modify a file and modifications that delete a file. If, for example, a file change log record indicates that a particular file has been deleted, indexing module 120 can remove all references to that file in the index 122. Indexing module 120 will not need to attempt to recalculate the indexing information associated with that file, since that file has been deleted.

In some embodiments, if file change log 136 already indicates that, within a pre-specified time period, a file has been modified, an additional entry in the file change log 136 to record that the file has changed again during that period would be duplicative. In one such embodiment, an administrator can classify operations into categories indicating how often (e.g., never, each time, or once per period) the occurrence of each operation should be identified in the file change log. For example, operations such as writes, appends, and truncations can be written to the file change log selectively (e.g., only once during a given time period). Subsequent writes, appends, and truncations can be performed without subsequent records being written to the file change log until the given time period elapses. In such a situation, write, append, and truncation operations can be classified as operations to be selectively logged.

Applications can determine which files have recently changed by accessing the file change log 136, without needing to repeatedly scan the entire file system. For example, indexing module 120 can initially scan the entire file system in order to create index 122. Thereafter, indexing module 120 accesses file change log 136 to identify changes to files 134 within namespace 132. Indexing module 120 then selectively updates index 122 based on the files that file change log 136 identifies as having been modified. Accordingly, updates to index 122 can be performed without needing to access each and every searchable file within namespace 132.

In alternative embodiments, instead of first scanning the entire file system, and then beginning to use the file change log for updates, indexing module 120 can begin updating the index based on changed files identified in the file change log immediately upon start up. Meanwhile, indexing module 120 can index the other unchanged files in the background.

Indexing module 120 can selectively update index 122 by performing an incremental index, which only updates certain criteria within the index (as opposed to recreating the entire index) in response to changed files. In particular, indexing module 120 can scan each file that file change log 136 identifies as having been recently modified. Indexing module 120 can identify the keywords and other criteria that are associated with each recently modified file. Indexing module 120 can then perform one or more incremental updates to index 122, which update only those criteria that were identified for each of the recently modified files. For example, if file A contained seven instances of keyword B prior to being modified, but contains no instances of keyword B subsequent to being modified, indexing module 120 can perform an incremental update to index 122 to remove any association between file A and keyword B.

In some embodiments, file change log 136 identifies which portions of particular files have been modified. For example, for each modification that is recorded in file change log 136, file change log 126 can identify the modified file as well as an offset and length within the modified file. The file offset identifies the location, within the file, at which the modified portion of the file begins, and the length identifies how long that modified portion is. For example, if only one byte of the file is modified, the file offset can identify the offset at which the modified byte is located within the file as well as the length (one byte) of the modified portion of the file. In one embodiment, this information is formatted as a tuple record. The two fields included in the tuple store information pertaining to the offset and length, respectively, of a read/write access (e.g., <offset, length>). In such an embodiment, indexing module 120 can then process this information to determine user access statistics such as access frequency, access duration, file traits, and the like. These user access statistics can be determined for each file or each portion of a file identified in the file change log.

In embodiments in which file change log 136 identifies modifications to portions of files (as opposed to only identifying modifications on a per-file granularity), indexing module 120 can update index 122 based on only those portions of files 134 that are identified as having been recently modified. For example, if an extent that includes a few bytes is modified within a large database file, the file change log can identify the bytes that were modified. Indexing module 120 can use this information to identify the modified bytes, and will only scan those bytes that are identified as having been modified. Indexing module 120 can then update index 122 based on only the modified bytes, without having to rescan the entire database file.

In one embodiment, file system 128 stores information in file change log 136 identifying the new value of modified files and/or portions of files. In such an embodiment, indexing module 120 can scan the new value directly from the file change log 136, without needing to open the modified file. The file change log 136 can itself be stored in-core (e.g., in a file cache, page cache, and/or buffer cache implemented within system memory) within computing device 102(2), so that indexing module 120 can access an in-core copy of the new value without having to retrieve the modified file from storage device 130(2).

In some embodiments, the file change log may contain multiple entries that correspond to the same file and/or to the same portion of a file. In such embodiments, indexing module 120 can scan the file change log in reverse order (starting with more recent entries). As indexing module 120 retrieves information from the file change log that identifies modified files or portions of files, indexing module 120 can scan those files or portions of files and perform an incremental update to index 122. If a file or a portion of a file has already been scanned (e.g., if a record corresponding to that file or portion of a file has already been processed in the file change log), indexing module 120 will not rescan those files if additional records for those files or portions of files are found in the file change log. Thus, indexing module 120 will not unnecessarily rescan the files or portions of the files that have already been processed. Regardless of how many records in the file change log correspond to the same file or the same portion of a file, indexing module 120 will only update the index based on that file or that portion of a file once.

Figure 2:
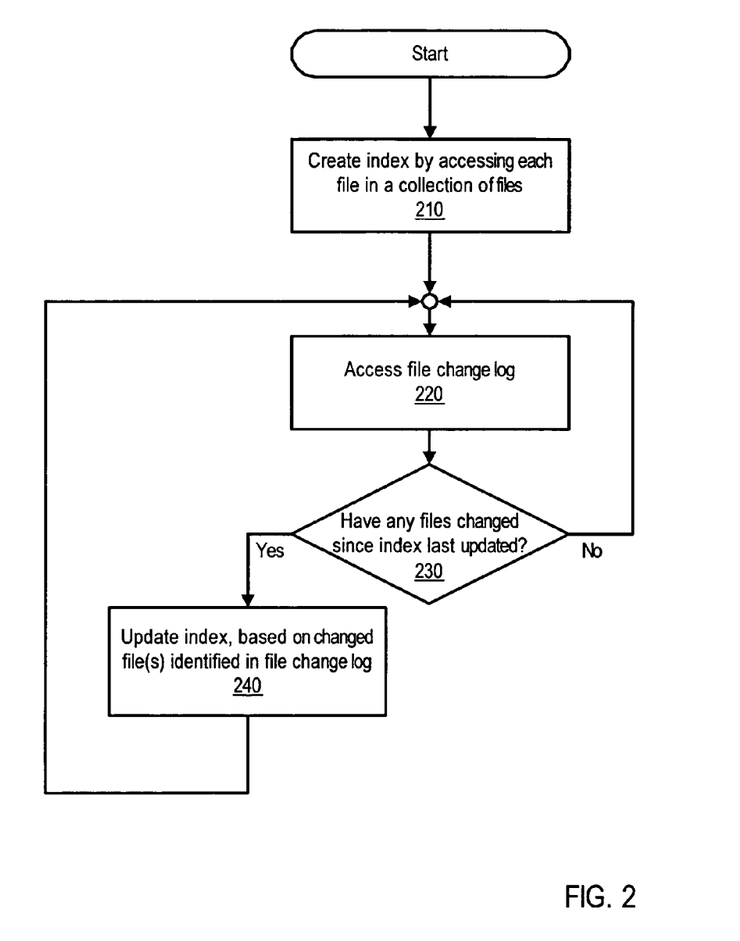
FIG. 2 is a flowchart of one embodiment of a method of updating a search engine index based on files identified in a file change log.

FIG. 2 is a flowchart of a method of updating an index based on files or portions of files identified in a file change log. The method of FIG. 2 can be performed by an application such as indexing module 120 of FIG. 1 (or a search engine 110, if the indexing functionality is integrated within the search engine).

The method begins at 210, when an application (e.g., indexing module 120 of FIG. 1) creates an index by accessing each file in a collection of files. The index can include various criterion, including keywords, user access statistics, and the like. The index is created by accessing each searchable file in the collection of files, identifying user access statistics about those files (e.g., based on information in the files' metadata and/or in a file change log), and scanning each file to identify information such as keywords within the file.

At 220, the application accesses a file change log. It is noted that the file change log is maintained by a file system, and the application performing operation 220 is external to (i.e., not integrated with) the file system. The application uses the file change log to determine whether any searchable files have changed since the index was last updated, as shown at 230. If so, the application updates the index, based on the changed file(s) identified in the file change log, as indicated at 240. Otherwise, the application does not update the index.

Operation 240 can be performed based on files or portions of files, depending on the granularity of information presented in the file change log. For example, if the file change log tracks changes to portions of files, operation 240 can be performed based on just those portions of the files that the file change log identifies as having been modified (as opposed to updating the index based on the entire contents of the modified files). If instead the file change log tracks changes on a per-file basis, operation 240 can be performed based on just those files that the file change log identifies as having been modified (as opposed to recreating the index based on all searchable files).

FIG. 3 illustrates a block diagram of a computing device that can be used to implement a computing device 102(1) (e.g., computing device 102(1) of FIG. 1) in a distributed file system. As illustrated, computing device 102(1) includes one or more processors 302 (e.g., microprocessors, PLDs (Programmable Logic Devices), or ASICs (Application Specific Integrated Circuits)) configured to execute program instructions stored in memory 306. Memory 306 can include various types of RAM (Random Access Memory), ROM (Read Only Memory), Flash memory, MEMS (Micro Electro-Mechanical Systems) memory, and the like. Node 102(1) also includes one or more interfaces 304. Processor 302, interface 304, and memory 306 are coupled to send and receive data and control signals by a bus or other interconnect.

Interface(s) 304 can include network interfaces to various networks and/or interfaces to various peripheral buses. Interface(s) 304 can include an interface to one or more storage devices on which various files (e.g., user files, an index, a file change log, and the like) are stored. Interface(s) 304 can also include an interface to a network, for use in communicating with other computing devices and/or for use in communicating with networked storage devices.

In this example, program instructions executable to implement an instance of a search engine 110 are stored in memory 306. As shown, search engine 110 includes an indexing module 120. Indexing module 120 can update an index 122, which can be stored on a persistent storage device such as storage device 130(1), based on a file change log, as described above. An in-core copy 122(1) of all or part of the index can also be stored in memory 306. While indexing module 120 is shown as part of search engine 110 in this example, it is noted that indexing module 120 can also be implemented separately from search engine 110 in other embodiments.

The program instructions and data implementing indexing module 120 and/or search engine 110 can be stored on various computer readable media such as memory 306 and storage device 130(1). In some embodiments, file system software is stored on a computer readable medium such as a CD (Compact Disc), DVD (Digital Versatile Disc), hard disk, optical disk, tape device, floppy disk, and the like). In order to be executed by processor 302, the instructions and data implementing indexing module 120 and/or search engine 110 are loaded into memory 306 from the other computer readable medium. The instructions and/or data implementing indexing module 120 and/or search engine 110 can also be transferred to computing device 102(1) for storage in memory 306 via a network such as the Internet or upon a carrier medium. In some embodiments, a computer readable medium is a carrier medium such as a network and/or a wireless link upon which signals such as electrical, electromagnetic, or digital signals, on which the data and instructions implementing indexing module 120 and/or search engine 110 are encoded, are conveyed.

File Change Log

The following description provides more details about the implementation of the file change log, in one embodiment. It is noted that the file change log can be implemented differently in other embodiments.

In one embodiment, a header file for the file change log contains data used by applications to read and/or interpret file change log records. The header file contains information identifying the types of changes included in the file change log, the file change log superblock data structure, the file change log record structure, and various variable definitions.

In one embodiment, static information for the file change log is stored in a superblock for the file change log. The superblock resides in the first block of the file change log, at offset zero. Applications are expected to read the first block each time the file change log is opened for read access to obtain structural information about the file change log.

The superblock can include the following data fields: a "magic" number, a version number, a state ("ON" or "OFF") of the file change log, a synchronization count, an activation time, and a first valid offset, which indicates the location from which the first valid record can be read. The magic number field contains a value that is unlikely to turn up by chance and is used to indicate that the file containing the superblock is the file change log. The state field indicates whether the file change log is enabled or disabled. The state can be used, in conjunction with the activation time field described below, by applications to determine whether or not changes may have been missed since the last read of the file change log. When the file change log is activated, the state variable can be set to ON and a new file change log created. Once the file change log is created, extents (contiguous blocks in the file system) are allocated to the file change log, and changes to files in the fileset begin to be logged. If the file change log state is OFF, the file change log is empty, space allocated to the file change log has been freed, and changes to the file system are not being logged.

If the file change log state is ON, but other information (such as the activation time field) for the file change log is different, the file change log may have been disabled and re-enabled. In both situations, applications such as indexing module 120 may be unaware of changes in the file system that occurred in the interim. If an application has missed changes to the file system, the application may need to rescan the entire file system to establish a new baseline from which changes are tracked.

The synchronization count field is related to the frequency with which data write records are written to the file change log. The synchronization count field is explained in further detail below.

The activation time field indicates the time that the file change log was activated and can be used by an indexing module 120 to determine that the file change log was disabled and re-enabled after the application last read the file change log. In such a case, the indexing module has missed data since the last read of the file change log and should establish a new baseline from which to track changes.

The first valid offset field indicates a location in the file change log from which to begin reading. This offset information is provided because the file change log is a sparse file, and records can be deleted from the beginning of the file. When records are deleted from the beginning of the file, no log records exist from the beginning of the file change log to the offset location; a "hole" has been punched in the file. In another embodiment, a last valid offset field is also included to indicate a location in the file change log at which to stop reading.

To determine the offset in the file change log from which to read the file change log records, applications such as indexing module 120 can first read the superblock found at offset zero of the file change log and then read the current last valid read offset information described above. Each record in the file change log indicates a change to a file in the file system.

A reverse name lookup function provides an external application, such as indexing module 120, with a full path name for the changed file. The reverse name lookup function is used to identify a full path name from the information in the file change log. For example, the file change log can store an inode number, which corresponds to a modified file, in each file change log record. An application, such as indexing module 120, can provide this inode number to the reverse name lookup function in order to find out which file is identified in the file change log record. The reverse name lookup function returns a full path name for the file.

In one embodiment, administrator-configurable variables are provided to enable an administrator to "tune" the file change log to perform efficiently within the specific application environment for which changes are tracked. These variables include a write interval variable, indicating a minimum length of time between recording data changes to a file in the file change log; a maximum allocation variable, determining a maximum allocation of storage space for the file change log; a "keep time" variable, providing a length of time to keep records in the file change log before removing them; and a delete size variable, indicating the amount of space to be freed by deleting records when the file change log file itself becomes full or when the records are old enough to be removed. Deleting records to make room for other records is also referred to as "punching a hole" in the file, and the delete size variable is also referred to as a "hole size" variable.

In one embodiment, entries in file change log 136 include the following information: a change type, a next record type, an identifier for the file that was modified, a timestamp for the change, a generation count, and/or a file name length. The change type field value can indicate one of the following types of changes: file information (metadata) change, file create, file link, file delete ('delete,' 'unlink,' and 'remove' are used interchangeably herein, as different file systems may use different terminology for deleting a file), file rename ('rename' and 'move' are used interchangeably herein), file unde- lete, file data append, file data overwrite, file data truncate, file extended attribute change, file hole punched (indicates that data have been deleted in the file to make room for additional data).

For operations such as a file rename or delete, the file system updates the corresponding file change record to include the name of the file being renamed or deleted and an identifier, such as the inode number of the directory, that uniquely identifies the directory in which the changed file resided. The unique directory identifier is provided in addition to the identifier for the file. Using the file name and the file and directory identifiers, an application can construct a full path name for the file by using the reverse name lookup function to determine the pathname of the directory and then combining that pathname with the file name.

The next record type field is used to indicate when a file name record follows (as when a rename or delete operation has been performed). Not all operations on a file require that a file name be written to the file change log; for example, the identifier of the file may be sufficient when the data in the file are updated. The timestamp field indicates the time at which the file described in the file change log record was changed.

The generation count variable is used for file systems that allow a unique file number to be re-used when the file is deleted. Such systems include file systems running under the UNIX operating system, in which a unique number for the file, called an inode number, is re-used. The file generation count variable indicates whether the current instance of the file identified by the unique file identifier is the file for which the file change record was written.

In one embodiment, a copy of the file change log is maintained in memory and periodically flushed to disk. Consequently, records are written to and read from the in-memory version of the file change log. A check is made in the read( ) code to determine whether the file change log is being read. If so, the read operation is redirected to the in-memory version of the file change log instead.

In one embodiment, the file change log is a sparse file and file change records may not fill the entire space allocated for the file change log. To prevent applications from reading beyond the end of valid records in the file change log, a "last valid read offset" can also be maintained, for example, in the file system in memory. Applications are expected to read the last valid read offset before reading the file change log, and to read only records between the first and the last valid read offsets. Reads of the file change log are checked for attempts to read beyond the last valid read offset, and such attempts to read beyond the offset can be prevented or signaled to the application by returning zero bytes read or some other special value. Applications can store the last valid offset read for each time the application reads the file change log. In subsequent reads, the application can begin reading the file change log from that point.

Records are written to the file change log asynchronously as atomic transactions. In one embodiment, a record of a change is received in memory, written to a file system intent log, and later committed to disk. The last valid read offset is updated as new records are written to the file change log.

Changes associated with actual writes to data on disk are handled as a special case, since file system performance would be affected by writing each occurrence of a file data write to the file change log. As long as all applications reading the file change log can reliably determine whether a file has been updated at least once in a known interval of time, individual records of data changes are not necessary for the file change log. For example, it can be sufficient for an application to identify whether the file was updated in a 10 minute interval, without identifying number of updates to the file or the exact timing of those update(s).

The frequency of writing the "file data append," "file data overwrite," and "file data truncate" records can be determined by a timeout (corresponding to the file change log write interval variable) or by an application synchronization point. The timeout method tracks changes according to an file change log write interval. The file change log write interval can be maintained in the file change log superblock. In one embodiment, each file has three timestamps, corresponding to the following change types: file data append, file data write, and file data truncate. In one embodiment of the file change log, timestamp values are not saved each time data are changed. Instead, the three timestamps are maintained in memory associated with a file identifier for a corresponding file. These timestamps are initially set to zero so that the first data write record of each type (append, overwrite, truncate) is recorded.

When doing a write operation on a particular file, the timestamp for the appropriate data write operation for that file is checked. The timestamp indicates a need to update the file change log when the time elapsed between the current write operation and the timestamp is greater than the value of the file change log write interval or the timestamp has been reset to zero to trigger writing additional data write records. A file change log record is written and the timestamp associated with the file identifier is reset to the current time. This new timestamp therefore records the last time that a data write operation of this change type for this file was written to the file change log. The timestamp can be used to avoid writing additional data write records of the same change type for the file until the file change log write interval has elapsed. The file change log record is written as an asynchronous transaction.

The file change log write interval limits the number of duplicative writes to the file change log, while still providing a guarantee that the writes are written frequently enough to meet the needs of the applications using the file change log. The file change log write interval is typically much smaller than the time in which file change log entries expire, i.e. the time that the file system guarantees that file change log records will be available in the file change log.

It may be desirable for some applications to capture all writes to files after a particular point in time. Therefore, an application may read the file change log at more frequent intervals than the file system writes data change records to the file change log, depending upon the value of the file change log write interval variable. For example, the file system may be preventing the addition of data change records for data changes to a given file because one data change record for that file has already been added during the file change log write interval. The file system can be configured to allow additional data write records to be added before the file change log write interval expires.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   accessing a file, wherein
      the file stores a file change log maintained by a file system,
      the file change log identifies one or more recently modified files; and
   updating an index, based on a recently modified file identified in the file change log, wherein
      the index is used to search files maintained by the file system,
      the updating comprises accessing a recently modified portion of the recently modified file, not accessing an unmodified portion of the recently modified file, and updating a portion of the index that corresponds to the recently modified portion of the recently modified file, and
      the accessing and the updating are performed by an application external to the file system.

2. The method of claim 1, wherein
   an updated portion of the index includes indexing information associated with a keyword, and
   the keyword is included in the file.

3. The method of claim 1, wherein
   the file change log identifies a recently modified portion of a recently modified file by a file identifier, length and offset.

4. The method of claim 1, wherein the accessing the recently modified portion of the recently modified file comprises accessing an in-core copy of the recently modified portion of the recently modified file, without opening the recently modified file.

5. The method of claim 4, wherein the in-core copy of the recently modified portion of the recently modified file is stored in the file change log.

6. The method of claim 1, wherein
   the application executes on a different computing node than the file system.

7. The method of claim 1, wherein
   the accessing the recently modified file comprises scanning information stored in the file change log in reverse order,
   the updating the portion of the index comprises updating the portion of the index a single time, and
   the file change log identifies that the recently modified file has been modified two or more times.

8. A system comprising:
   a processor; and
   a memory coupled to the processor, wherein the memory stores computer readable instructions executable to implement:
      a file system configured to maintain a file, wherein
         the file stores a file change log, and
         the file change log identifies one or more recently modified files; and
      an indexing module coupled to the file system, wherein
         the indexing module is configured to access the file and to update an index, based on a recently modified file identified in the file change log,
         the indexing module is configured to update the index by accessing a recently modified portion of the recently modified file, not accessing an unmodified portion of the recently modified file, and updating a portion of the index that corresponds to the recently modified portion of the recently modified file, and
         the index is used to search files maintained by the file system.

9. The system of claim 8, wherein
   the file change log identifies a recently modified portion of a file by a file identifier, length and offset.

10. The system of claim 8, wherein
    the indexing module is configured to access the recently modified portion of the recently modified file by accessing an in-core copy of the recently modified portion of the recently modified file, and the in-core copy of the recently modified portion of the recently modified file is stored in the file change log.

11. The system of claim 8, wherein the indexing module is implemented on a different computing node than the file system.

12. The system of claim 8, wherein
the indexing module is configured to access the recently modified file by scanning information stored in the file change log in reverse order,
the indexing module is configured to update the portion of the index by updating the portion of the index a single time, and
the file change log identifies that the recently modified file has been modified two or more times.

13. A system comprising:
interface means for accessing a file, wherein
the file stores a file change log maintained by a file system,
the file change log identifies one or more recently modified files; and
means for updating an index, based on a recently modified file identified in the file change log, wherein
the index is used to search files maintained by the file system,
updating the index comprises accessing a recently modified portion of the recently modified file, not accessing an unmodified portion of the recently modified file, and updating a portion of the index that corresponds to the recently modified portion of the recently modified file, and
the means for accessing and the means for updating are included in an application external to the file system.

14. The system of claim 13, wherein
an updated portion of the index includes indexing information associated with a keyword, and
the keyword is included in the file.

15. The system of claim 13, wherein
the file change log identifies a recently modified portion of a recently modified file by a file identifier, length and offset.

16. The system of claim 13, wherein
the accessing the recently modified portion of the recently modified file comprises accessing an in-core copy of the recently modified portion of the recently modified file, and
the in-core copy of the recently modified portion of the recently modified file is stored in the file change log.

17. The system of claim 13, wherein
accessing the recently modified file comprises scanning information stored in the file change log in reverse order, updating the portion of the index comprises updating the portion of the index a single time, and
the file change log identifies that the recently modified file has been modified two or more times.

18. A computer readable storage medium comprising program instructions executable to:
access a file, wherein
the file stores a file change log maintained by a file system,
the file change log identifies one or more recently modified files; and
update an index, based on a recently modified file identified in the file change log, wherein
the program instructions are executable to update the index by accessing a recently modified portion of the recently modified file, not accessing an unmodified portion of the recently modified file, and updating a portion of the index that corresponds to the recently modified portion of the recently modified file, and
the index is used to search files maintained by the file system.

19. The computer readable storage medium of claim 18, wherein
an updated portion of the index includes indexing information associated with a keyword, and
the keyword is included in the file.

20. The computer readable storage medium of claim 18, wherein
the file change log identifies a recently modified portion of a recently modified file by a file identifier, length and offset.

21. The computer readable storage medium of claim 18, wherein
the program instructions are executable to access the recently modified portion of the recently modified file by accessing an in-core copy of the recently modified portion of the recently modified file, and
the in-core copy of the recently modified portion of the recently modified file is stored in the file change log.

22. The computer readable storage medium of claim 18, wherein
the program instructions are executable to access the recently modified file by scanning information stored in the file change log in reverse order,
the program instructions are executable to update the portion of the index by updating the portion of the index a single time, and
the file change log identifies that the recently modified file has been modified two or more times.

* * * * *